United States Patent
Yeoh et al.

(10) Patent No.: US 7,348,545 B2
(45) Date of Patent: Mar. 25, 2008

(54) SYSTEM AND METHOD FOR OPTICAL ENCODING ON TWO OPPOSED SURFACES OF A PATTERN MEDIUM

(75) Inventors: Theng Hooi Yeoh, Penang (MY); Hock Aun Tan, Kedah (MY)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 0 days.

(21) Appl. No.: 11/155,961

(22) Filed: Jun. 17, 2005

(65) Prior Publication Data

US 2006/0284061 A1 Dec. 21, 2006

(51) Int. Cl.
G01D 5/34 (2006.01)
G01B 11/14 (2006.01)

(52) U.S. Cl. .................... 250/231.13; 356/614

(58) Field of Classification Search ..............................
250/231.13–231.18, 237 G; 341/11, 13,
341/31; 33/1 PT, 1 N; 356/614, 616, 617
See application file for complete search history.

(56) References Cited

U.S. PATENT DOCUMENTS

| | | | | |
|---|---|---|---|---|
| 4,513,235 A | * | 4/1985 | Acklam et al. | 318/685 |
| 4,670,737 A | * | 6/1987 | Rilling | 341/13 |
| 4,736,187 A | * | 4/1988 | Kibrick et al. | 341/3 |
| 4,795,902 A | * | 1/1989 | Kitaue | 350/231.13 |
| 5,241,172 A | * | 8/1993 | Lugaresi | 250/231.16 |
| 5,313,069 A | * | 5/1994 | Tham | 250/559.26 |
| 5,519,299 A | * | 5/1996 | Ferri et al. | 318/640 |
| 5,663,794 A | * | 9/1997 | Ishizuka | 356/499 |
| 5,723,858 A | * | 3/1998 | Sugden | 250/231.13 |
| 6,586,719 B1 | * | 7/2003 | Bartzke et al. | 250/221 |
| 6,803,560 B1 | | 10/2004 | Okumura et al. | |
| 7,022,975 B2 | * | 4/2006 | Horton | 250/234.14 |
| 2003/0193016 A1 | | 10/2003 | Chin et al. | |
| 2005/0087681 A1 | | 4/2005 | Chin et al. | |
| 2005/0166413 A1 | * | 8/2005 | Crampton | 33/503 |

FOREIGN PATENT DOCUMENTS

JP          08254439 A   * 10/1996

OTHER PUBLICATIONS

"Agilent AEAS-7000 Plug and Play Ultra-Precision Absolute Encoder 16-bit Gray Code", Agilent Technologies, www.agilent.com/semiconductors, Feb. 23, 2004, 8 pages.

"Agilent AEDR-8300 Series Encoders Reflective Surface Mount Optical Encoder", Agilent Technologies, www,agilent.com/semiconductors, Jun. 7, 2004, 10 pages.

* cited by examiner

*Primary Examiner*—Georgia Epps
*Assistant Examiner*—Suezu Ellis

(57) ABSTRACT

An optical encoder system is disclosed with a single pattern medium having a first coded pattern disposed on the first side, a second coded pattern disposed on the second side, a first optical encoder disposed toward the first side, and a second optical encoder disposed toward the second side. An optical encoder device is disclosed with a first coded pattern disposed on the first side, and a second coded pattern disposed on the second side. There is disclosed a method for using an optical encoder device to obtain information related to a motor which includes the steps of illuminating a first coded pattern disposed on a first side of a pattern medium, illuminating a second coded pattern disposed on a second side of the pattern medium, detecting light reflected from the first side, detecting light reflected from the second side, and analyzing the reflected light.

4 Claims, 6 Drawing Sheets

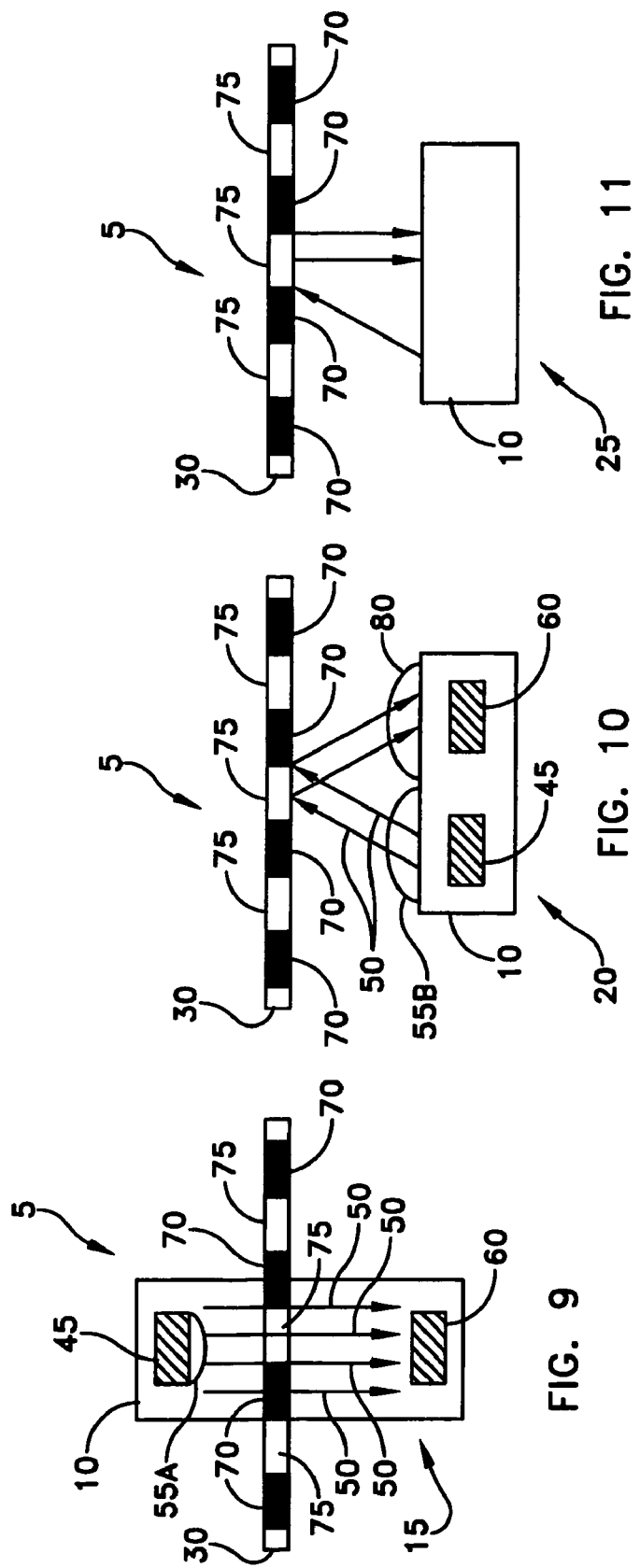

SYSTEM AND METHOD FOR OPTICAL ENCODING ON TWO OPPOSED SURFACES OF A PATTERN MEDIUM

BACKGROUND

FIGS. 9-14 illustrate typical designs of an optical encoder system 5 using an emitter/detector module 10 configured to provide closed-loop feedback to a motor control system. There are various configurations of optical encoder system 5 to provide closed-loop feedback to a motor control system. Optical encoder 5 can be designed in a transmissive configuration 15 (FIG. 9), a reflective configuration 20 (FIG. 10), or an imaging configuration 25 (FIG. 11). When operated in conjunction with a pattern medium 30, which typically includes a codewheel 35 (FIG. 12) or a codestrip 40 (FIG. 13), optical encoder 5 translates rotary motion or linear motion into a two-channel digital output.

Referring to FIGS. 9-11, optical encoder 5 contains an emitter 45, such as an LED 45, as a light source. In transmissive encoder 15 (FIG. 9), light 50 is collimated into a parallel beam by means of a lens 55A located over LED 45. Opposite to emitter 45 is a detector 60 that includes photodiode arrays 65 (FIGS. 12 and 13) and a signal processor (not shown). When pattern medium 30 moves between emitter 45 and detector 60, light beam 50 is interrupted by the pattern of bars 70 and spaces 75 on pattern medium 30.

Similarly, in reflective encoder 20 (FIG. 10) or imaging encoder 25 (FIG. 11), lens 55B (FIG. 10) or another light shaping device over LED 45 focuses light 50 onto pattern medium 30. Depending on the position of pattern medium 30, light 50 is either reflected or not reflected back to emitter/detector module 10. Reflected light 50 may be received through emitter/detector module 10 through lens 80 over photo-detector 60. The movement of pattern medium 30 causes an alternating pattern of light and dark corresponding to the pattern of bars 70 and spaces 75 to fall upon photodiodes 60. Photodiodes 60 detect these interruptions and the outputs are processed by the signal processor to produce digital waveforms. These encoder outputs can be used to provide information about position, velocity and acceleration of the motor.

Referring to FIGS. 12 and 13, light shaping components 55C, 55D, and 55E may be used in addition to or in place of lens 55A (FIG. 9) or lens 55B (FIG. 10). Light shaping component 55C may include a beam expander. Light shaping component 55D may include a collimating lens. Light shaping component 55E may include a cylindrical lens.

Referring now to FIG. 12, there is shown a conventional approach for an optical encoder system 5 using an absolute encoder pattern medium 30. Optical encoder system 5 includes a glass disc 35 with a suitable number of concentric tracks 85, each having alternated transparent zones 70 and opaque zones 75. These patterns allow the angular position of disc 35 to be determined. All tracks are illuminated by LED 45 from one side of disc 35. Light beam 50 is modulated by tracks 85. A narrow radial slit 90 limits the width of light beam 50 passing through. Narrow radial slit 90 is also referred to as collimating slit 90. Collimated light beam 50 is collected by a photodiode array 65 on the side of disc 35 opposite to LED 45. Optionally, a second narrow radial slit 92 is disposed prior to photodiode array 65 so as to reduce cross talk between adjacent detectors and to add flexibility to use the same detector with different levels of resolution by changing the reticle opening. Each photodiode of array 65 is the input element of a read-out channel. Each photodiode of array 65 amplifies the corresponding signal and generates digital waveforms suitable for subsequent processing.

An absolute optical rotary encoder 5 using this conventional approach provides direct and absolute information related to the angular position of a mechanical system to which disc 35 is connected. For example, a drive shaft is one such type of mechanical system. The number of resolution bits (Sn) is equal to the number of disc tracks 85. Typically, gray code is used to minimize read-out errors.

Referring to FIG. 13, there is shown a linear code strip 40, which has an assembly with LED 45 and photodiodes assembly 65 similar to rotary codewheel 35. One difference from rotary codewheel 35 is that linear code strip 40 has a linearized pattern 95 rather than concentric tracks 85. Typically, to obtain higher resolution or accuracy of the encoder, whether rotary codewheel 35 or linear codestrip 40, requires more tracks 85 or traces 95 on pattern medium 30. For example, a 13 bit absolute encoder typically has 13 tracks 85 or traces 95. As each one of tracks 85 or traces 95 occupies space, i.e. radially for rotary codestrip 35 and transversely for linear codestrip 40, the pattern medium 30 essentially defines the cross-sectional width of encoder system 5. Any increase in the width of pattern medium 30 in turn increases the size of the final product containing encoder system 5. It should be understood that 13-bit absolute encoder normally requires 13 tracks on the codewheel. However, there are methods known in the art to achieve higher number of bits than the actual number of tracks on the codewheel through electronic interpolation of the output signals.

SUMMARY OF THE INVENTION

In one embodiment, there is provided an optical encoder system for obtaining information about motion, the optical encoder system comprising a pattern medium having a first side and a second side in opposition to one another, a first coded pattern disposed on the first side of the pattern medium, and a second coded pattern disposed on the second side of the pattern medium, wherein the first coded pattern has portions configured to reflect light, and wherein the second coded pattern has portions configured to reflect light; a first optical encoder disposed toward the first side of the pattern medium, and the first optical encoder configured to produce a first output signal corresponding to the first coded pattern; and a second optical encoder disposed toward the second side of the pattern medium, and the second optical encoder configured to produce a second output signal corresponding to the second coded pattern; wherein the first output signal and the second output signal are analyzed to obtain information about motion.

In another embodiment, there is provided an optical encoder device for obtaining information related to a motor, the optical encoder device comprising a pattern medium having a first side and a second side in opposition to one another, a first coded pattern disposed on the first side of the pattern medium, and a second coded pattern disposed on the second side of the pattern medium, wherein the first coded pattern has portions configured to reflect light, and wherein the second coded pattern has portions configured to reflect light.

In yet another embodiment, there is provided a method for using an optical encoder device to obtain information related to a motor, the method comprising illuminating a first coded pattern disposed on a first side of a pattern medium, illuminating a second coded pattern disposed on a second side of the pattern medium, the first side and the second side in opposition to one another wherein the first coded pattern has portions configured to reflect light, and wherein the second coded pattern has portions configured to reflect light; detecting light reflected from the first side of the pattern medium to produce a first output signal corresponding to the first coded pattern; detecting light reflected from the second side of the pattern medium to produce a second output signal corresponding to the second coded pattern; and analyzing the first output signal and the second output signal to obtain information about the motor.

Other embodiments are also disclosed.

BRIEF DESCRIPTION OF THE DRAWINGS

Illustrative embodiments of the invention are illustrated in the drawings, in which:

FIG. 9 illustrates a transmissive type of optical encoder system;

FIG. 10 illustrates a reflective type of optical encoder system;

FIG. 11 illustrates an imaging type of optical encoder system;

DETAILED DESCRIPTION

Figure 3:
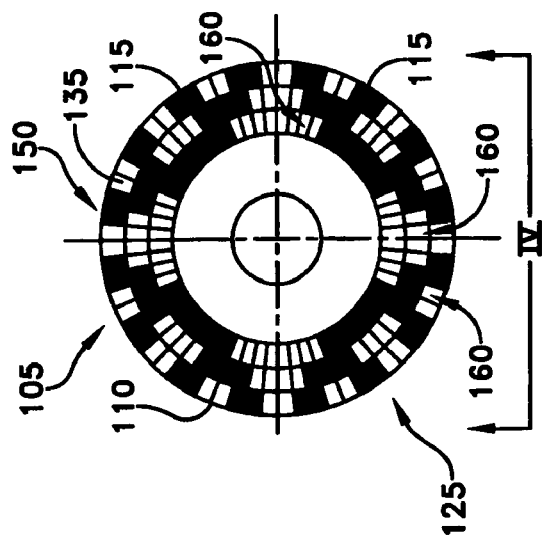
FIGS. 1-4 illustrate a novel system for optical encoding on two opposed surfaces of a single pattern medium in the shape of a codewheel.
Figure 4:
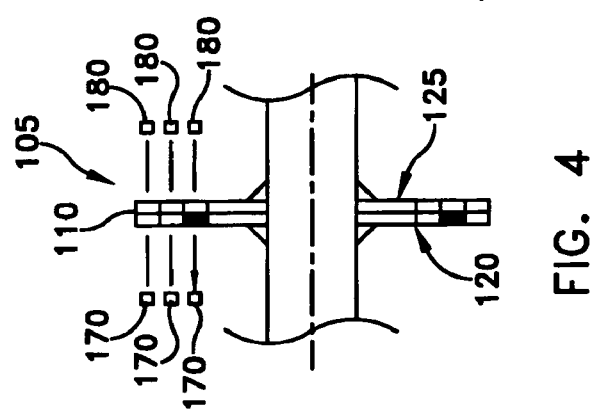

Referring to FIGS. 1-8, and in two exemplary embodiments, there is shown a novel reflective encoder system 105 having a double-sided code pattern on a single pattern medium 110. An optical encoder system 105 is configured for obtaining information about motion. Optical encoder system 105 generally includes a pattern medium 110 with light reflecting portions 115. Pattern medium 110 of optical encoder system 105 has light reflecting portions 115 disposed on both a first side 120 and a second side 125. A first coded pattern 130 is formed by light reflecting portions 115 on first side 120 of pattern medium 110. A second coded pattern 135 is formed by light reflecting portions 115 on second side 125 of pattern medium 110.

A first optical encoder 140 is disposed toward first side 120 of pattern medium 110. First optical encoder 140 is configured to produce a first output signal corresponding to first coded pattern 130. A second optical encoder 145 is disposed toward second side 125 of pattern medium 110. Second optical encoder 145 is configured to produce a second output signal corresponding to second coded pattern 135. The first output signal and the second output signal are analyzed to obtain information about motion.

Looking at FIGS. 1-4, and in an exemplary embodiment, optical encoder device 105 has pattern medium 110 in the form of a codewheel 150. A plurality of tracks 155 disposed on first side 120 of codewheel 150 form first coded pattern 130. The first output signal produced by first optical encoder 140 corresponds to each one of the plurality of tracks 155 of first coded pattern 130. A plurality of tracks 160 disposed on second side 125 of codewheel 150 form second coded pattern 135. The second output signal produced by second optical encoder 145 corresponds to each one of the plurality of tracks 160 of second coded pattern 135.

Figure 2:
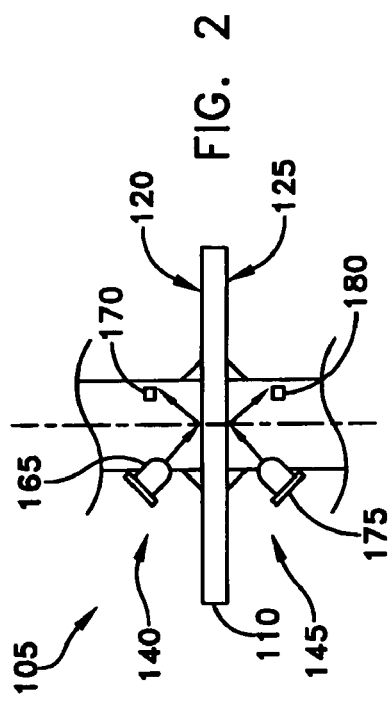

Referring to FIG. 2, there is shown first optical encoder 140 together with codewheel 150. First optical encoder 140 includes a plurality of emitters 165 and receivers 170 corresponding to the plurality of tracks 155 disposed on first side 120 of codewheel 150, respectively, and second optical encoder 145 comprises a plurality of emitters 175 and receivers 180 corresponding to the plurality of tracks 160 disposed on second side 125 of codewheel 150, respectively. Either a single light source or multiple light sources can be used to illuminate each of photodetectors arrays 170 and photodetector arrays 180.

Looking at FIGS. 5-8, there is shown pattern medium 110 in the form of a linear codestrip 185 with two-sided pattern coded surfaces. In an exemplary embodiment, optical encoder device 105 has a plurality of traces 190 disposed on first side 120 of codestrip 185 to form first coded pattern 130. The first output signal produced by first optical encoder 140 corresponds to each one of the plurality of traces 190 of first coded pattern 130. A plurality of traces 195 disposed on second side 125 of codestrip 185 form second coded pattern 135. The second output signal produced by the second optical encoder 145 corresponds to each one of the plurality of traces 195 of second coded pattern 135. With photodetector array 170 and photodetector array 180 at either side of patterned medium 110, the code from each set of traces 190 and traces 195 can be modulated and encoded on side 120 and side 125, respectively.

Figure 6:
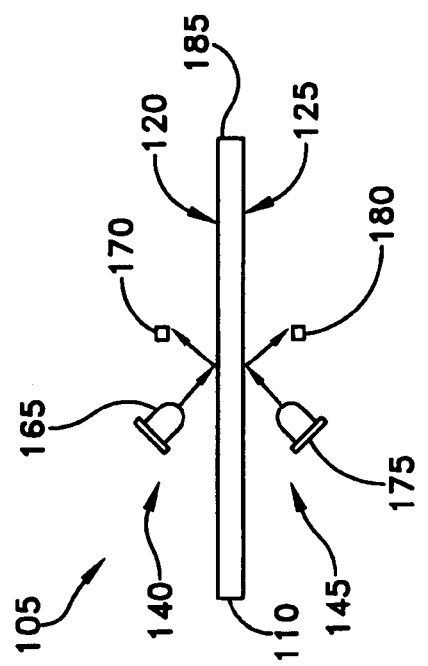
Figure 5:
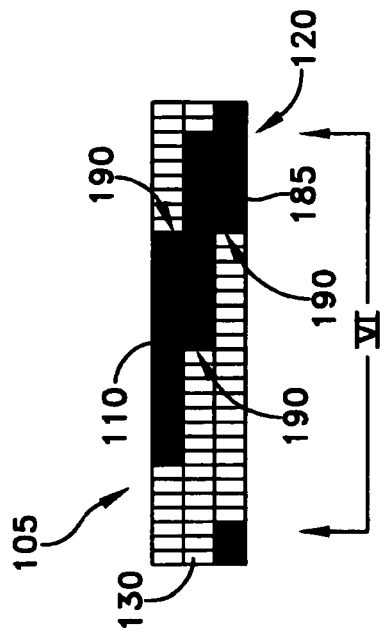
Figure 12:
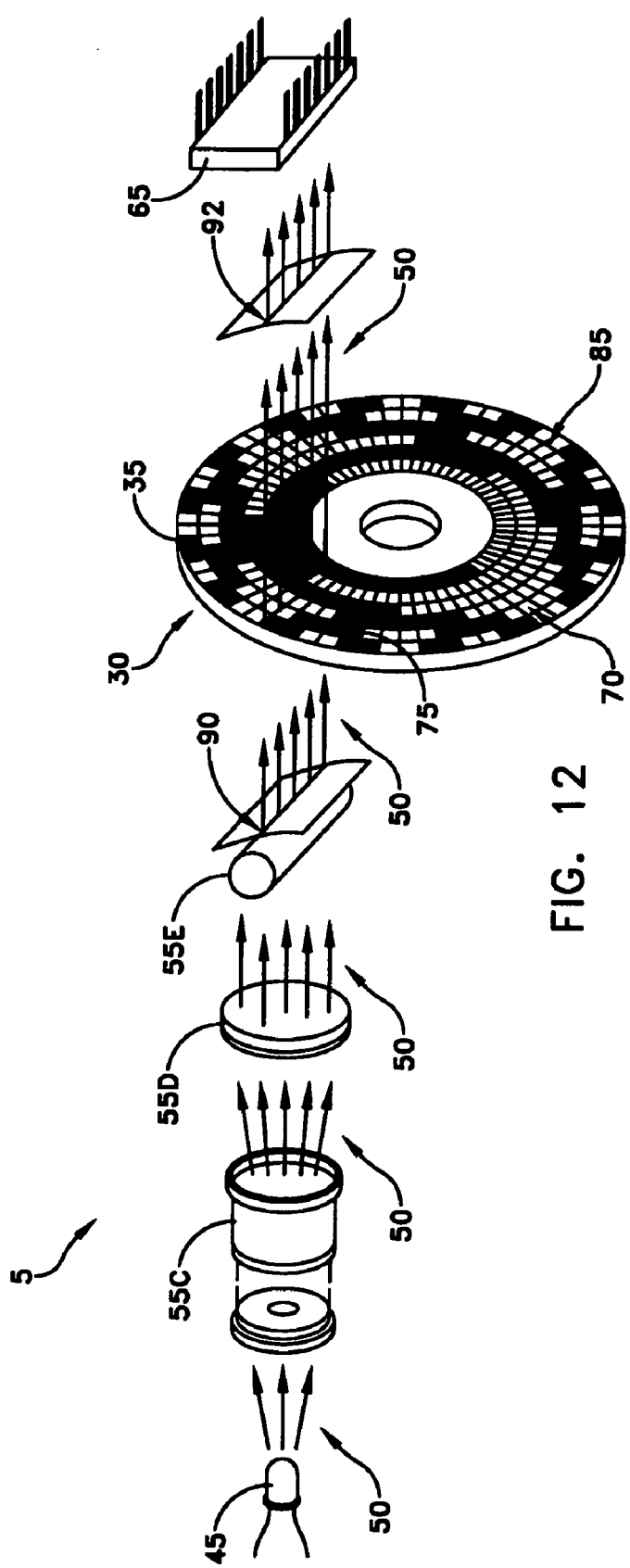
FIG. 12 illustrates a codewheel in a transmissive type of optical encoder system.
Figure 13:
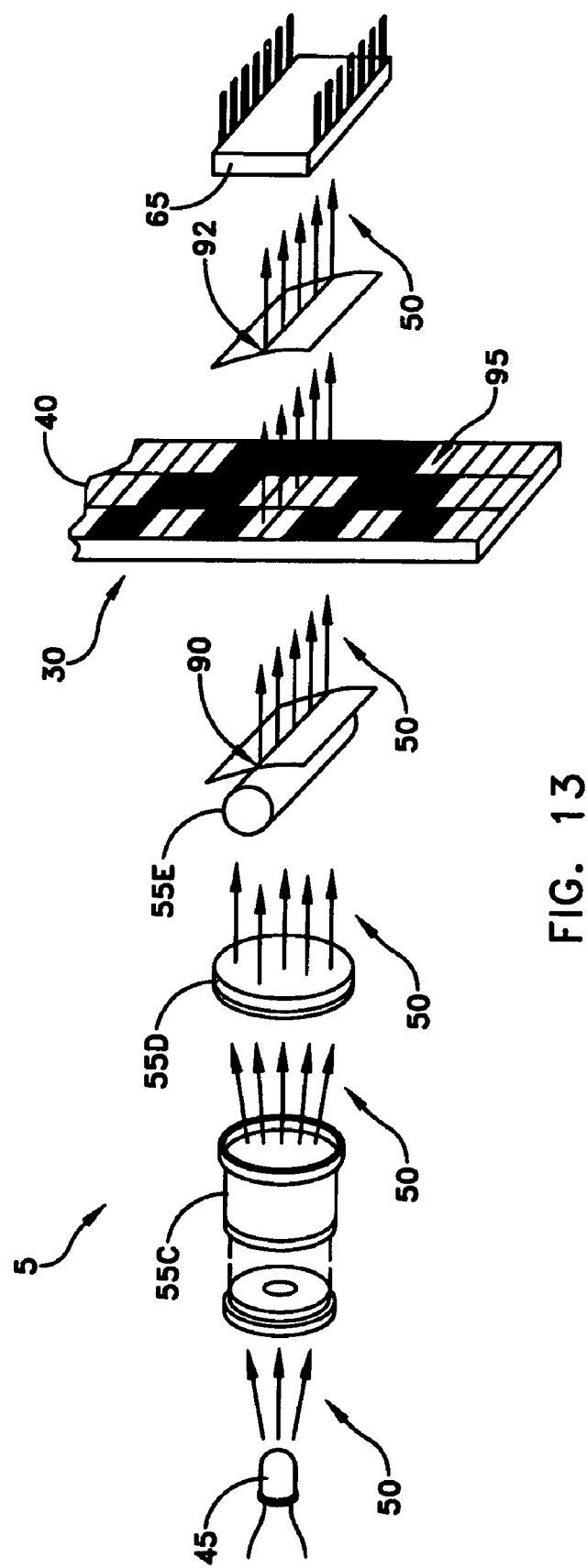
FIG. 13 illustrates a codestrip in a transmissive type of optical encoder system.

Referring to FIG. 6, there is shown first optical encoder 140 together with codestrip 185. First optical encoder 140 includes a plurality of emitters 165 and receivers 170 corresponding to the plurality of traces 190 disposed on first side 120 of codestrip 185, respectively, and second optical encoder 145 comprises a plurality of emitters 175 and receivers 180 corresponding to the plurality of traces 190 disposed on second side 125 of codestrip 185, respectively. Either a single light source or multiple light sources can be used to illuminate each of photodetectors arrays 170 and photodetector arrays 180.

In one embodiment, optical encoder system 105 provides first optical encoder 140 with an emitter 165 and a detector 170 positioned toward first coded pattern 130, respectively. Emitter 165 illuminates first coded pattern 130 and detector 170 of first optical encoder 140 receives reflected light from first coded pattern 130. In addition, second optical encoder 145 includes an emitter 165 and a detector 170 positioned toward second coded pattern 135, respectively. Emitter 165 illuminates second coded pattern 135 and detector 175 of second optical encoder 145 receives reflected light from second coded pattern 135. For example, first optical encoder 140 may be disposed within a single package and second optical encoder 145 may also be disposed within a single package.

Figure 1:
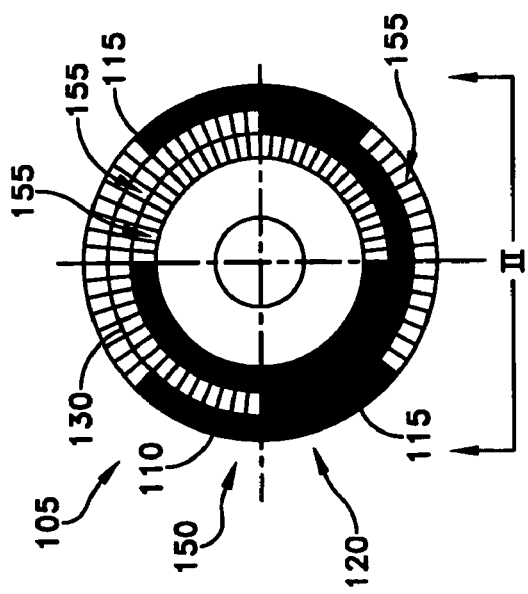
Figure 7:
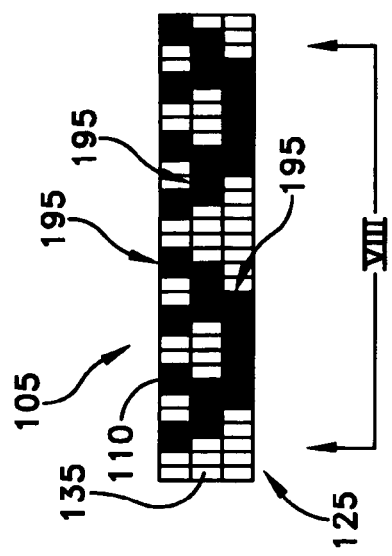
FIGS. 5-8 illustrate a novel system for optical encoding on two opposed surfaces of a single pattern medium in the shape of a codestrip.
Figure 8:
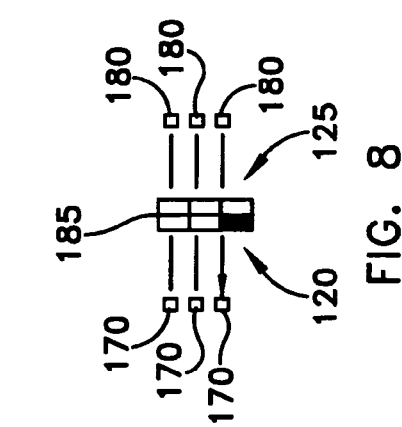
Figure 15:
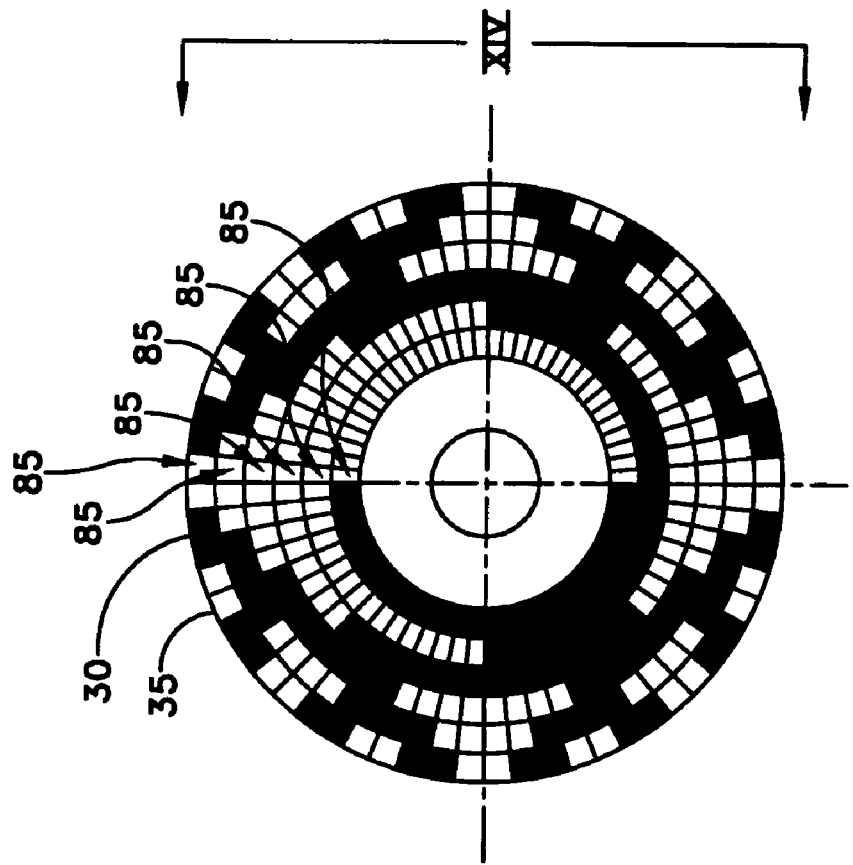
FIG. 15 illustrates a planar view of the 6 track codewheel shown in FIG. 14.
Figure 14:
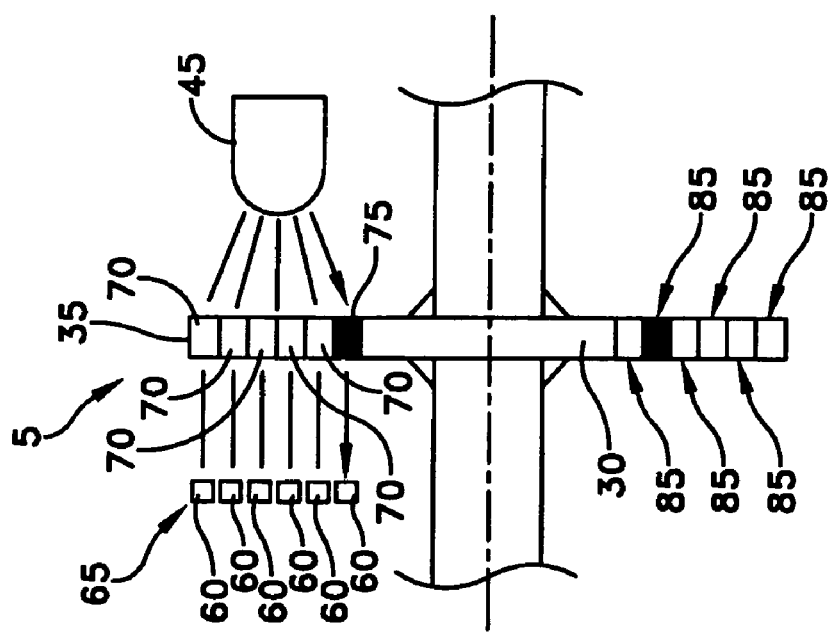
FIG. 14 illustrates a cross-sectional view of a 6 track codewheel having in a transmissive type of optical encoder system.

Referring to FIGS. 14 and 15, there is shown a typical 6-bit resolution pattern medium 30 with 6 tracks 85, which causes pattern medium 30 to have a diameter of 42 mm. In one embodiment, novel reflective encoder system 105 (FIGS. 1 and 3) has a double-sided code pattern on single pattern medium 110 with a 30 mm diameter. The functional area of the pattern is reduced radially as the three (3) outmost tracks 85 of codewheel 35 (FIG. 15) are reassigned on pattern medium 110 (FIGS. 1 and 3) so as to position three (3) tracks 115 on first side 120 (FIG. 1) and position another three (3) tracks on second side 125 (FIG. 3) in opposition to tracks 115 on first side 120. The code integrity of the pattern illustrated by tracks 85 in FIG. 15 is retained by tracks 115 disposed on both sides of pattern medium 110 (FIGS. 1 and 3).

In an embodiment, one or more of position information, velocity information, acceleration information, or direction of movement information is obtained through analysis of the first output signal and the second output signal.

In an embodiment, there is disclosed a method for using optical encoder system 105 to obtain information related to motion. A first coded pattern disposed on a first side of a pattern medium is illuminated. A second coded pattern disposed on a second side of the pattern medium is illuminated. First side and second side are in opposition to one another. Each of first coded pattern and second coded pattern has portions configured to reflect light. Light reflected from the first side of the pattern medium is detected to produce a first output signal corresponding to the first coded pattern. Light reflected from the second side of the pattern medium is detected to produce a second output signal corresponding to the second coded pattern. First output signal and second output signal are analyzed to obtain information about the motion.

In an embodiment, a pattern medium with a two-sided coded surface provides a smaller encoder system with a higher resolution than an encoder system having a pattern medium with a single patterned surface. This smaller encoder system may allow applications with smaller devices, i.e., a miniature motor. In addition, the Agilent reflective encoder module identified as "AEDR-8300" is one reflective encoder module that can be used in this type of application. This provides a relatively inexpensive solution for a high resolution application.

What is claimed is:

1. An optical encoder system, comprising:
a codewheel pattern medium comprising a disk containing a double-sided code pattern, wherein a first portion of the double-sided code pattern is contained in a first set of concentric reflective tracks disposed on a first side of the disk and a second portion of the double-side code is contained in a second set of concentric reflective tracks disposed directly opposing the first set of concentric reflective tracks on a second opposing side of the disk;
a first optical encoder disposed toward the first side of the disk, the first optical encoder configured to produce a first output signal comprising the first portion of the double-side code pattern; and
a second optical encoder disposed toward the second opposing side of the disk, the second optical encoder configured to produce a second output signal comprising the second portion of the double-side code pattern.

2. The optical encoder system of claim 1, wherein a first reflective track in the first set of concentric reflective tracks is disposed on the first side of the disk at a first radial distance from the center of the disk, and a second reflective track in the second set of concentric reflective tracks is disposed on the second side of the disk at a second radial distance from the center of the disk, the first radial distance being equal to the second radial distance.

3. The optical encoder system of claim 1, wherein the double-side code pattern is used to obtain one of a) position information, b) velocity information, c) acceleration information, and d) movement information from the codewheel pattern medium.

4. The optical encoder system of claim 1, wherein the first optical encoder comprises a first light emitter and a first photodetector and the second optical encoder comprises a second light emitter and a second photodetector.

* * * * *